July 22, 1969 W. G. CARLSON ET AL 3,457,052
HIGH TEMPERATURE, ELECTRICALLY CONDUCTIVE HERMETIC SEALS
Filed Sept. 14, 1965

WITNESSES:

INVENTORS
William G. Carlson
Christy J. Moratis and
William A. English.
BY
ATTORNEY

United States Patent Office 3,457,052
Patented July 22, 1969

3,457,052
HIGH TEMPERATURE, ELECTRICALLY CONDUCTIVE HERMETIC SEALS
William G. Carlson and Christy J. Moratis, Pittsburgh, and William A. English, Export, Pa., assignors to Westinghouse Electric Corporation, Pittsburgh, Pa., a corporation of Pennsylvania
Filed Sept. 14, 1965, Ser. No. 487,226
Int. Cl. B21b; B21c
U.S. Cl. 29—199                                5 Claims

ABSTRACT OF THE DISCLOSURE

Structural members are joined together by a high temperature, electrically conductive hermetic seal comprising an outer layer of platinum having intimate contact with, and good adhesion to, one of the structural members to be joined together, an inner layer of platinum having intimate contact with, and good adhesion to, the other structural member to be joined together, a layer of a metal whose initial composition before formation of the seal is gold or 18 percent by weight of nickel and the remainder gold centrally disposed between, joined to, and alloyed with the inner and outer layers of platinum by respective intermediate metal layers comprising gold.

---

This invention relates to high temeprature, electrically conductive hermetic seals and processes for producing the same.

Heretofore, the main deterrent to fabricating practical solid electrolyte fuel cells, particularly those composed of solid solution electrolytes of alkaline earth oxides or rare earth oxides combined with the oxide of zirconium, has been the inability to form a high temperature, electrically conductive hermetic seal between adjoining fuel cells. A high temperature, electrically conductive hermetic seal is necessary since practical fuel cell design dictates that a series of small, electrically connected cells be employed to minimize the IR drop in the cell electrodes.

It is, therefore, an object of this invention to provide a high temperature, electrically conductive hermetic seal for joining structural members together.

Another object of this invention is to provide a hermetic seal between structural members that is electrically conductive and capable of withstanding temperatures up to 1000° C.

Another object of this invention is to provide a process for joining together structural members with an electrically conductive hermetic seal capable of sustaining temperatures up to 1000° C.

Other objects will, in part, be obvious and will, in part, appear hereinafter.

For a better understanding of the nature and objects of the present invention refernce should be had to the following detailed description and drawings, in which.

In accordance with the present invention and in attainment of the foregoing objects, there is provided a high temperature electrically conductive hermetic seal suitable for joining structural members together.

The hermetic seal comprises two outer layers of a first type of metal. Each of the two outer layers form a firm adherent bond with each one of the structural members to be joined together. A centrally disposed layer of a second type of metal forms the central portion of the seal.

Figure 1:
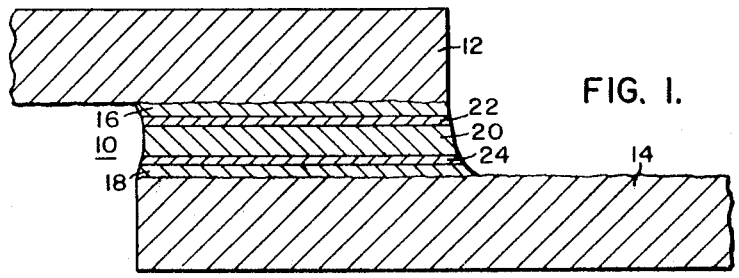
FIGURE 1 is a cross-sectional view of a high temperature, electrically conductive hermetic seal made in accordance with the teachings of this invention.

With reference to FIG. 1, there is shown a high temperature, electrically conductive hermetic seal 10. The seal 10 joins together two structural members 12 and 14. The structural members 12 and 14 are preferably of the same material or of similar material in order that the coefficient of expansion of each member is the same.

The seal 10 is particularly suitable for joining two solid electrolyte fuel cell elements together. Solid electrolyte fuel cell elements comprising a material selected from the group consisting of alkaline earth oxides and rare earth oxides combined with zirconium oixde which form the members 12 and 14 in FIG. 1 may be joined together by the seal 10.

A first layer 16 of a first type of metal, particularly platinum, is disposed in an intimate, good adhesive and electrical contact with the member 12. A second layer 18 of the first type of metal is disposed in an intimate, good adhesive and electrical contact with the member 14. A third layer 20 of a second type of metal, such as gold, is suitably disposed between the layers 16 and 18 in a manner which produces layers 22 and 24 of a third type of metal. The third type of metal is an alloy of the first and the second type of metals, such for example as a platinum-gold alloy.

Figure 2:
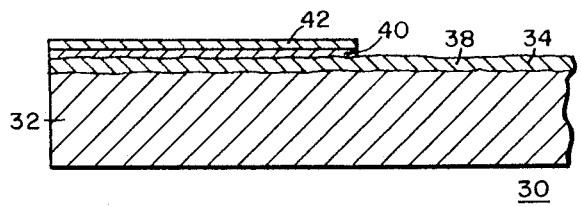
FIG. 2 is a cross-sectional view of a structural member prepared in accordance with the teachings of this invention for joining with another similarly prepared structural member to effect a high temperature electrically conductive hermetic seal.

With reference to FIG. 2, there is shown a prepared member 30 suitable for joining to another similarly prepared member by the seal 10.

The prepared member 30 is comprised of a structural member 32 having a surface 34. The surface 34 is roughened by suitable means such, for example, as sandblasting with No. 1 alumina followed by chemical etching in boiling aqua regia. A time of 10 minutes has been found to be suitable for etching ceramic solid electrolyte fuel cell members in boiling aqua regia.

The member 32 is then cleansed of the aqua regia. A suitable process for cleansing the member 32 of ceramic material comprises washing the member 32 in cold deionized water. The member 32 is then rinsed for 20 minutes in boiling deionized water followed by a further rinsing in cold deionized water. The member 32 is then dried at a temperature of 200° C. for approximately one hour.

A coating 38 is then disposed by suitable means on the roughened surface 34. The coating 38 is a paste consisting of finely divided particles, or flakes, of platinum metal suspended in an organic vehicle such, for example, as polystyrene, cellulose acetate and the like. The paste may be thinned with an organic solvent such, for example as acetone, turpentine, Cellosolve acetate and the like. The coating 38 and the member 32 are then heated to drive off the organic material and decompose the platinum compound, if present, in order that the only remaining material comprising the coating 38 is platinum. The weight of the platinum coating 38 should be 5 to 15 milligrams per square centimeter. A preferred weight range for the platinum coating 38 is 8 to 10 milligrams per square centimeter.

The coating 38 may be air sprayed onto the surface 34. Several spray coatings, each followed by heating member 32 with the coating 38 to a temperature above 600° C. and preferably at 1250° C., for a time of ¼ to 2 hours, may be required to obtain the desired weight of platinum in the coating 38.

A layer 40 of platinum is deposited on a preferential portion of the coating 38 of platinum. The layer 40 may be deposited by any means known to those skilled in the art such, for example, as electrolytic deposition. The layer 40 is desirable to achieve and optimum total weight of platinum of the surface 32, in the area where the high temperature, electrically conductive hermetic seal will be formed, of from 6 to 25 milligrams per square centimeter.

The layer 40 deposited will therefore vary in weight from 1 to 9 milligrams per square centimeter. The average weight of platinum required by the electrolytic deposition is from 3 to 4 milligrams per square centimeter. The layer 40 also provides a smooth continuous surface which enhances the forming of the seal.

The layer 40 of platinum is then annealed. The annealing operation is carried out in an electric furnace having an air atmosphere. The furnace temperature is 1150° C. ±5° C. The furnace time to achieve proper annealing is from 5 to 60 minutes, averaging 20 minutes usually.

A layer 42 of gold is then deposited on the layer 40. The layer 42 is a flash deposit and enhances the wetting of the layer 40 by the brazing metal during the joining operation. The layer 42 of gold may be deposited by any means known to those skilled in the art, including electrolytic deposition. A weight of gold ranging from 1 to 2 milligrams per square centimeter has been found sufficient.

Two prepared members, the same as the member 30 of FIG. 2, are suitably fixtured in such a manner that the gold layer 42 of each member is diametrically opposite to each other. The gold layer 42 of each member 30 may be in point contact with each other but enough of a gap should be present to allow the brazing metal to flow between them by capillary action.

A preformed length of pure gold or a gold nickel alloy is then disposed at one end of the opening between the gold layers 42. The fixtured members, with the gold in place, is heated to 1090° C.±5° C. in a controlled atmosphere furnace to effect the high temperature, electrically conductive hermetic seal. The furnace atmosphere is hydrogen of a dew point of less than −60° C. The furnace time at temperature is from 1 to 20 minutes.

The amount of the preformed gold or gold-nickel alloy should be sufficient to fill the entire void between the two prepared members with a very slight excess. Too small an amount of gold or gold-nickel alloy results in a permeable seal. Too large an amount of gold or gold-nickel alloy attacks the platinum outside of the seal area which acts as an electrode in solid electrolyte fuel cells. In severe cases, a complete separation of the platinum electrode from the seal occurs. The preferred composition of the gold-nickel alloy is 18% by weight of nickel and the balance is gold.

The high temperature, electrically conductive seal taught by this invention has very little electrical resistance at high temperatures. Even at sustained high temperature operating conditions for more than 19 days the increase in resistance approximates 12% but is still only slightly greater than 0.03 ohm.

Figure 3:
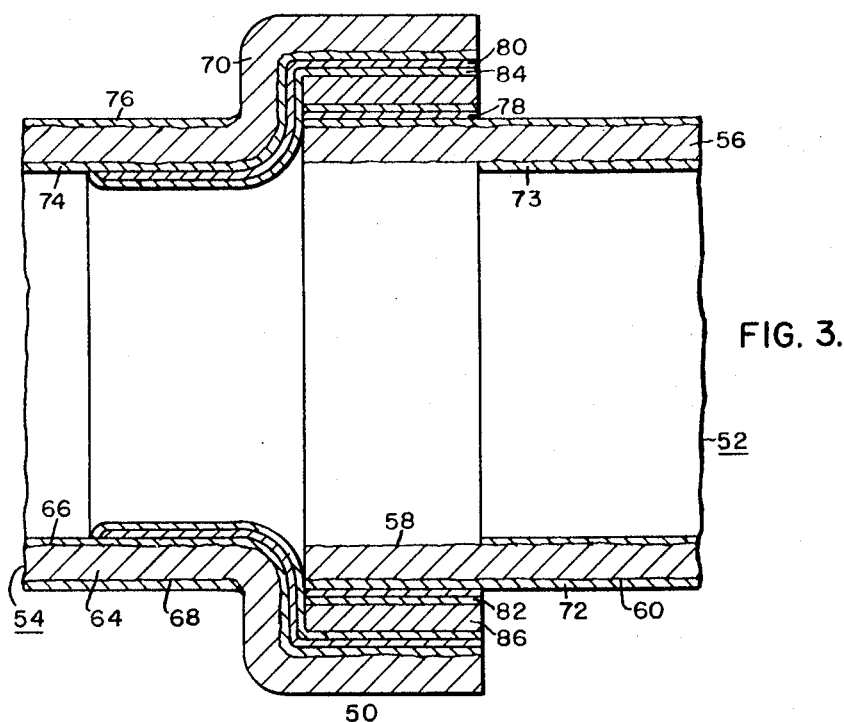
FIG. 3 is a cross-sectional view of a high temperature, electrically conductive hermetic seal joining together two solid electrolyte fuel cells.

With reference to FIG. 3 there is shown a high temperature, electrically conductive seal 50 which joins together two solid electrolyte fuel cells 52 and 54 of a bell-and-spigot design.

The seal 50 is formed by joining together a male end of a first solid electrolyte fuel cell 52 with a female end of a second solid electrolyte fuel cell 54.

The male end of the cell 52 comprises a structural member 56 having an inner surface area 58 and an outer surface area 60.

The female end of the cell 54 comprises a structural member 64 having an inner surface 66, an outer surface 68 and an outwardly extending peripheral cup-like flange 70, of greater inner diameter than the remainder of the member 64, formed at the extremity of the cell 54.

The members 56 and 54 are of the same material or of materials having very similar coefficients of expansion. Suitable material may be selected from the group consisting of alkaline earth oxides and rare earth oxides combined with zirconium oxide, and combinations thereof.

The surfaces 58, 60 and 66 and 68 of the respective cells 52 and 54 are roughened by means such as sandblasting and chemical etching. After washing and drying, selected areas are covered with coatings 72, 73, 74 and 76 of platinum. The platinum is deposited by spraying a paste consisting of finely divided platinum suspended in an organic vehicle and thinned by an organic solvent onto the selected surface. The weight of platinum deposited in this manner may vary from 5 to 15 milligrams per square centimeter with a preferred range of 8 to 10 milligrams per square centimeter. The coated cells 52 and 54 are then heated to 1250° C. in an air atmosphere for one hour. This furnace process drives off the organic material leaving the coatings 72, 73, 74 and 76 now comprising platinum firmly adhering to the members 56 and 64 where the platinum acts as an electrical conductor.

Coatings 78 and 80 of platinum are deposited by suitable means such as electrodeposition on the joint areas of the members 56 and 64, respectively. The coatings 78 and 80 have a weight of platinum of from 1 to 9 milligrams per square centimeter. The preferred range is 3 to 4 milligrams per square centimeter. The coatings 78 and 80 are then annealed at 1150° C. for approximately 20 minutes.

Flash coatings 82 and 84 of gold are next deposited by suitable means such, for example, as electro-deposition on the coatings 78 and 80, respectively. The weight of gold deposited is only 1 to 2 milligrams per square centimeter.

The male portion of the cell 52 is then inserted into the female portion of the cell 54. A slip fit is all that is necessary. A point contact between the gold layers 82 and 84 is permissible providing a suitable space between the layers 82 and 84 remains for the brazing material to be distributed between the layers 82 and 84 by capillary action. A preformed ring of pure gold or gold-nickel alloy is then placed on the joint resting on the flange 70 of the female portion. A small amount of graphite is placed on the coating 72, exclusive of the joint area, to inhibit the reaction between the gold braze ring and the platinum electrode material.

The gold-nickel alloy comprises 18% by weight of nickel and the balance is gold. The cells 52 and 54, with the suitably placed preformed ring is then placed in a controlled atmosphere furnace. The atmosphere is hydrogen having a dew point of less than −60° C. The furnace time is from 1 to 20 minutes. The furnace temperature is 1090° C.± 5° C.

The resulting seal 86 is an electrically conductive hermetic seal capable of operating in temperatures up to 1000° C. The seal 50 is not permeable to helium when the cells have an internal pressure of one micron and an external pressure of 1 atmosphere at room temperature.

Example I

A high temperature, electrically conductive seal as shown in FIG. 3 was prepared in accordance with the teaching of this invention.

The structural members of the solid electrolyte fuel cells comprised a solid solution of 0.09 mole percent of $Y_2O_3$ and the balance was $ZrO_2$. The surfaces of the members were sandblasted lightly with No. 1 alumina grit. The members were then boiled in a solution of aqua regia for 10 minutes.

The members were then washed in cold deionized water followed by a 20 minute rinse in boiling deionized water. The members were then rinsed in cold deionized water a seocnd time and dried by heating them for one hour at 200° C.

The areas of the members which were not to be platinum coated were masked off. A spray coating of a paste consisting of finely divided platinum suspended in an organic vehicle was applied to the unmasked exterior surfaces and joint regions of the members. The deposited material averaged 4 to 5 milligrams per square centimeter. The members, with the spray coatings of platinum were then placed in a furnace for 1 hour at approximately 1250° C. to effect the platinum coating and to void the organic vehicle. The furnace atmosphere was air. A second spray coating was then applied and the heating process repeated.

An electrolytic deposit of platinum averaging about 6 milligrams per square centimeter was then applied to the joint areas of the members. A flash plating of gold averaging 1 to 2 milligrams per square centimeter was then electrolytically deposited upon the aforesaid platinum deposition.

The male portion of the joint was then inserted into the female portion of the joint. A thin coating of graphite was applied to the entire platinum coating except for that portion which was to be joined to the female portion of the other member.

A preformed ring of pure gold was then placed on the joint resting on the top of the cup-like flange of the female portion.

The O.D. of the male portion measured 0.435 inch. The I.D. of the female portion measured 0.436 inch —0+0.0005 inch. The resulting gap was 0.0015, to —0.0005 inch. It was calculated that the weight of gold required to form the proper seal which was 1.36 inches in length would be 0.057 gram.

The cell members and the gold ring were then placed in a furnace having an atmosphere of hydrogen for 15 minutes at a temperature of 1090° C.±5° C. The hydrogen had a dew point less than —60° C.

The resulting joint proved to be impervious at an internal pressure of one micron and an external pressure of 1 atmosphere when helium leak detection was performed at room temperature.

A high temperature, electrically conductive seal embodying the teachings of this invention is particularly useful in joining together structural members comprising platinum which are employed in making scientific equipment. While the invention has been described with reference to particular embodiments and examples, it will be understood, of course, that modifications, substitutions and the like may be made therein without departing from its scope.

We claim as our invention:

1. A high temperature, electrically conductive hermetic seal for joining together two structural members, said seal comprising
   (1) an outer layer of platinum having intimate contact with, and good adhesion to, one of the structural members which are to be joined together;
   (2) an inner layer of platinum having intimate contact with, and good adhesion to, the other of the structural members to be joined together by said seal;
   (3) a centrally disposed layer of a metal, said metal layer initially, before formation of the seal, consisting of a metal selected from the group consisting of gold and an alloy of 18 precent by weight of nickel and the remainder gold disposed centrally between said inner and said outer platinum layers;
   (4) a first intermediate layer of metal disposed between, integral with, and alloyed to at least a portion of said outer layer of platinum and said centrally disposed layer, said first intermediate layer comprising gold; and
   (5) a second intermediate layer of metal disposed between, integral with, and alloyed to, at least a portion of said inner layer of platinum and said centrally disposed layer, said second intermediate layer comprising gold.

2. A high temperature, electrically conductive hermetic seal for joining together two structural members, each of said structural members comprising a material selected from the group consisting of alkaline earth oxides, rare earth oxides, zirconium oxide and mixtures thereof, said high temperature, electrically conductive hermetic seal comprising
   (1) an outer layer of platinum, said outer layer having intimate contact with, and good adhesive bonding to, one of the structural members to be joined together;
   (2) an inner layer of platinum, said inner layer having intimate contact with, and good adhesive bonding to, the other of the structural member to be joined together;
   (3) a centrally disposed layer of metal, said metal layer initially, before formation of the seal, consisting of a metal selected from the group consisting of gold and an alloy of 18 percent by weight of nickel and the remainder gold;
   (4) a first intermediate layer of metal disposed between, integral with, and alloyed to at least a portion of said outer layer and said centrally disposed layer, said first intermediate layer comprising gold; and
   (5) a second intermediate layer of metal disposed between, integral with, and alloyed to at least a portion of, said inner layer and said centrally disposed layer, said second intermediate layer comprising gold.

3. The high temperature, electrically conductive hermetic seal of claim 2 in which each of said structural members comprises a solid solution prepared from a mixture of yttrium oxide and zirconium oxide.

4. A high temperature, electrically conductive seal for joining together two platinum structural members, said high temperature, electrically conductive hermetic seal comprising
   (1) an outer layer of a metal alloy of platinum and gold having intimate contact with, and good adhesion to, one of the platinum members to be joined together;
   (2) an inner layer of a metal alloy of platinum and gold having intimate contact with and good adhesion to, the other of the platinum members to be joined together; and
   (3) a centrally disposed layer of gold metal, said centrally disposed layer being disposed between, integral with, and alloyed to, said inner layer and said outer layers of metal alloy.

5. A high temperature, electrically conductive hermetic seal for joining together two platinum structural members, said high temperature, electrically conductive hermetic seal comprising
   (1) an outer layer of a metal alloy of platinum, gold and nickel having intimate contact with, and good adhesion to, one of the platinum members to be joined together;
   (2) an inner layer of a metal alloy of patinum, gold and nickel having intimate contact with, and good adhesion to, the other of the platinum members to be joined together; and
   (3) a centrally disposed layer of an alloy of gold and nickel being disposed between, integral with, and alloyed to said inner and said outer layers of metal alloy, said alloy of gold and nickel having an initial composition before heating to form said hermetic seal of 18 percent nickel and the remainder gold.

(References on following page)

References Cited

UNITED STATES PATENTS

| | | |
|---|---|---|
| 2,691,816 | 10/1954 | Siegel. |
| 2,973,283 | 2/1961 | Hill. |
| 2,984,894 | 5/1961 | Hill _____ 29—199 |
| 3,137,766 | 6/1964 | Teague _____ 29—199 XR |
| 3,162,512 | 12/1964 | Robinson _____ 29—199 |
| 3,217,404 | 11/1965 | Rhys _____ 29—199 |

HYLAND BIZOT, Primary Examiner

U.S. Cl. X.R.

29—195